(12) United States Patent
Tardif et al.

(10) Patent No.: US 10,499,021 B2
(45) Date of Patent: Dec. 3, 2019

(54) FOVEATED MEMS SCANNING DISPLAY

(71) Applicant: Microsoft Technology Licensing, LLC, Redmond, WA (US)

(72) Inventors: John Tardif, Sammamish, WA (US); Joshua O Miller, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 15/485,030

(22) Filed: Apr. 11, 2017

(65) Prior Publication Data
US 2018/0295331 A1    Oct. 11, 2018

(51) Int. Cl.
*H04N 9/31* (2006.01)
*G02B 26/10* (2006.01)
*G02B 27/01* (2006.01)

(52) U.S. Cl.
CPC ......... *H04N 9/3135* (2013.01); *G02B 26/105* (2013.01); *G02B 27/0101* (2013.01); *H04N 9/3155* (2013.01); *H04N 9/3161* (2013.01); *H04N 9/3164* (2013.01); *H04N 9/3185* (2013.01); *G02B 2027/0147* (2013.01); *G02B 2027/0154* (2013.01)

(58) Field of Classification Search
None
See application file for complete search history.

(56) References Cited

U.S. PATENT DOCUMENTS

| 6,351,335 | B1 | 2/2002 | Perlin |
| 7,252,394 | B1* | 8/2007 | Fu .......................... G03B 21/28 348/E9.026 |
| 2002/0024708 | A1 | 2/2002 | Lewis et al. |
| 2010/0149073 | A1 | 6/2010 | Chaum et al. |
| 2012/0105310 | A1 | 5/2012 | Sverdrup et al. |
| 2012/0212400 | A1 | 8/2012 | Border et al. |

(Continued)

OTHER PUBLICATIONS

James, Paul, "Hands on: SMI Proves that Foveated Rendering is Here and it Really Works", http://www.roadtovr.com/hands-on-smi-proves-that-foveated-rendering-is-here-and-it-really-works/, Published on: Jan. 10, 2016, 6 pages.

(Continued)

*Primary Examiner* — Joseph R Haley
*Assistant Examiner* — Emily J Frank
(74) *Attorney, Agent, or Firm* — Arent Fox LLP

(57) ABSTRACT

A scanning display device includes a MEMS scanner, a controller, light source drivers, light sources and an image processor. The controller controls rotation of MEMS mirror(s) of the MEMS scanner. Each light source driver selectively drives a respective one of the light sources to thereby produce a respective light beam that is directed towards and incident on a MEMS mirror of the MES scanner. The image processor causes two of the light source drivers to drive two of the light sources to thereby produce two light beams, when a first portion of an image is being raster scanned by the MEMS scanner. The image processor causes only one of the light source drivers to drive only one of the light sources to thereby produce only one light beam, when a second portion of the image is being raster scanned by the MEMS scanner. Related methods and systems are also disclosed.

20 Claims, 4 Drawing Sheets

(56) References Cited

U.S. PATENT DOCUMENTS

| | | |
|---|---|---|
| 2013/0016178 A1 | 1/2013 | Birkbeck et al. |
| 2013/0070109 A1 | 3/2013 | Gove et al. |
| 2013/0335302 A1 | 12/2013 | Crane et al. |
| 2014/0218468 A1 | 8/2014 | Gao et al. |
| 2014/0247277 A1 | 9/2014 | Guenter et al. |
| 2015/0268464 A1 | 9/2015 | Ranalli et al. |
| 2016/0033771 A1 | 2/2016 | Tremblay et al. |
| 2016/0274365 A1* | 9/2016 | Bailey ............... G02B 27/0093 |
| 2018/0149858 A1* | 5/2018 | Ito .................... G02B 26/0833 |
| 2018/0180871 A1* | 6/2018 | Costantini ............ B81B 3/0083 |

OTHER PUBLICATIONS

Liu, et al., "Design of a foveated imaging system using a two-axis MEMS mirror", In Proceedings of International Society for Optics and Photonics, vol. 6342, Jun. 22, 2006, 8 pages.

Milanovic, et al., "High Brightness MEMS Mirror Based Head-Up Display (HUD) Modules with Wireless Data Streaming Capability", In Proceedings of International Society for Optics and Photonics, Feb. 11, 2015, 8 pages.

Hua, et al., "A High-Resolution Optical See-Through Head-Mounted Display with Eyetracking Capability", In Journal of Optics Express, vol. 21, Issue 25, Dec. 9, 2013, pp. 30993-30998.

"International Search Report and Written Opinion Issued in PCT Application No. PCT/US18/025616", dated Jul. 18, 2018, 11 Pages.

\* cited by examiner

FOVEATED MEMS SCANNING DISPLAY

BACKGROUND

A scanning display device functions by creating "virtual pixels," each of which is a function of the position of a biaxial mirror (or the positions of two uniaxial mirrors) and the magnitude of the signals that drive one or more light emitting elements (e.g., laser diodes) of a light source that produces a light beam that is reflected by the mirror(s). The light emitting element(s) of the light source can be pulsed rapidly to create each pixel in a high resolution display.

Conventionally, the pixel density of an image produced by a scanning display device is substantially the same throughout the entire raster scanned image. Thus, when there has been a desire to increase a pixel density of an image, conventionally the pixel density of the entire image has been increased, which can increase both processing costs and power consumption costs.

SUMMARY

A scanning display device, and more generally an apparatus, includes a MEMS scanner, a controller, a plurality of light sources, a plurality of light source drivers and an image processor. The MEMS scanner includes a biaxial MEMS mirror or a pair of uniaxial MEMS mirrors. The controller is communicatively coupled to the MEMS scanner and configured to control rotation of the biaxial MEMS mirror or the pair of uniaxial MEMS mirrors of the MEMS scanner. Each of the light sources includes one or more light emitting elements, e.g., laser diodes. For example, each of the plurality of light sources includes red, green and blue laser diodes that are configured to respectively emit red, green and blue light and one or more optical elements that is/are configured to combine the red, green and blue light into a light beam. Each of the light source drivers is configured to selectively drive a respective one of the light sources to thereby produce a respective light beam that is directed towards and incident on the biaxial MEMS mirror or one of the pair of uniaxial MEMS mirrors. For example, each of the light source drivers can be configured to selectively drive the red, green and blue laser diodes of a respective one of the light sources to thereby selectively drive the respective one of the light sources.

In accordance with certain embodiments, the image processor is communicatively coupled to each of the light source drivers and is configured to cause at least two of the light source drivers to drive at least two of the light sources to thereby produce at least two light beams when a first portion of an image is being raster scanned by the MEMS scanner. The image processor is also configured to cause only one of the light source drivers to drive only one of the light sources to thereby produce only one light beam when a second portion of the image is being raster scanned by the MEMS scanner. This way, the first portion of the image is raster scanned using two light beams and has a higher line density than the second portion of the image, which is raster scanned using only one light beam.

In accordance with certain embodiments, the plurality of light sources include first, second and third light sources, and the plurality of light source drivers include first, second and third light source drivers. In certain such embodiments the image processor is configured to cause the first light source driver to not drive the first light source, and cause the second and third light source drivers to drive the second and third light sources respectively to thereby produce two light beams, when the first portion of the image is being raster scanned by the MEMS scanner. The image processor is also configured to cause the second and third light source drivers to not drive the second and third light sources, and cause the first light source driver to drive the first light source to thereby produce only one light beam, when the second portion of the image is being raster scanned by the MEMS scanner. In certain embodiments, a respective spot size of each of the two light beams, used to raster scan the first portion of the image, is smaller than a spot size of the only one light beam used to raster scan the second portion of the image.

In accordance with certain embodiments, the plurality of light sources include first and second light sources, and the plurality of light source drivers include first and second light source drivers. In certain such embodiments the image processor is configured to cause the first and second light source drivers to drive the first and second light sources, respectively, to thereby produce two light beams, when the first portion of the image is being raster scanned by the MEMS scanner. The image processor is also configured to cause the second light source driver to not drive the second light source, and cause the first light source driver to drive the first light source to thereby produce only one light beam, when the second portion of the image is being raster scanned by the MEMS scanner.

In certain embodiments, the first portion of the image has a first line density, and the second portion of the image has a second line density that is lower than the first line density. In certain such embodiments, the first portion of the image (raster scanned using two light beams) can correspond to a foveal region of the image, the second portion of the image (raster scanned using only one light beam) can correspond to a non-foveal region of the image. The location of the first portion of the image can be fixed relative to a rest of the image. Alternatively, the location of the first portion of the image can be dynamic relative to a rest of the image. For example, the location of the first portion of the image can be based on a gaze of an eye, as determined using eye tracking, and the location of the first portion of the image can change in response to the gaze changing.

Certain embodiments of the present technology related to methods for use with a MEMS scanner that includes a biaxial MEMS mirror or a pair of uniaxial MEMS mirrors that are used to raster scan an image. Such a method can include controlling rotation of the biaxial MEMS mirror or the pair of uniaxial MEMS mirrors of the MEMS scanner. The method can also include producing at least two light beams that are directed toward and incident on the biaxial MEMS mirror, or one of the pair of uniaxial MEMS mirrors, when a first portion of the image is being raster scanned by the MEMS scanner. The method can further include producing only one light beam that is directed towards and incident on the biaxial MEMS mirror, or one of the pair of uniaxial MEMS mirrors, when a second portion of the image is being raster scanned by the MEMS scanner. The first portion of the image can have a first line density and correspond to a foveal region of the image, and the second portion of the image can have a second line density that is lower than the first line density and can correspond to a non-foveal region of the image.

In accordance with a method, the only one light beam, that is produced when the second portion of the image is being raster scanned by the MEMS scanner, is neither of the two light beams that are produced and used when the first portion of the image is being raster scanned by the MEMS scanner. In accordance with another method, the only one light beam, that is produced and used when the second portion of the image is being raster scanned by the MEMS scanner, is one of the two light beams that are produced when the first portion of the image is being raster scanned by the MEMS scanner.

Such methods can also include tracking a gaze of an eye, and determining a location of the first portion of the image based on the tracked gaze. In such embodiments, the location of the first portion of the image can be changed in response to the tracked gaze changing.

Certain embodiments of the present technology are directed to a near eye or heads up display system that includes a MEMS scanner, a controller, a plurality of light sources, a plurality of light source drivers, an image processor and one or more optical waveguides. The MEMS scanner includes a biaxial MEMS mirror or a pair of uniaxial MEMS mirrors. The controller is communicatively coupled to the MEMS scanner and configured to control rotation of the biaxial MEMS mirror or the pair of uniaxial MEMS mirrors of the MEMS scanner. Each of the light sources includes one or more light emitting elements, e.g., laser diodes. Each of the light source drivers is configured to selectively drive a respective one of the light sources to thereby produce a respective light beam that is directed towards and incident on the biaxial MEMS mirror or one of the pair of uniaxial MEMS mirrors. The image processor is communicatively coupled to each of the light source drivers and configured to cause at least two of the light source drivers to drive at least two of the light sources to thereby produce at least two light beams when a first portion of an image is being raster scanned by the MEMS scanner. The image processor is also configured to cause only one of the light source drivers to drive only one of the light sources to thereby produce only one light beam when a second portion of the image is being raster scanned by the MEMS scanner. Each of the optical waveguides includes an input-coupler and an output-coupler.

In accordance with certain embodiments, light corresponding to the first and second portions of the image that are raster scanned using the biaxial MEMS mirror or the pair of uniaxial MEMS mirrors, under the control of the controller, is coupled into the one or more optical waveguides via the input-coupler(s) of the one or more optical waveguide(s). The light corresponding to the first and second portions of the image, that is coupled into the one or more optical waveguides via the input-coupler(s), travels at least in part by way of total internal reflection (TIR) from the input-coupler(s) to the output-coupler(s) of the one or more optical waveguides. The output-coupler(s) is/are configured to couple the light corresponding to the first and second portions of the image, that has traveled within the one or more optical waveguides from the input-coupler(s) to the output-coupler(s), out of the one or more optical waveguides.

The system can also include an eye tracker configured to track a gaze of an eye. In such an embodiment, the image processor can be configured to change a location of the first portion of the image based on changes to the gaze of an eye, as determined using the eye tracker. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
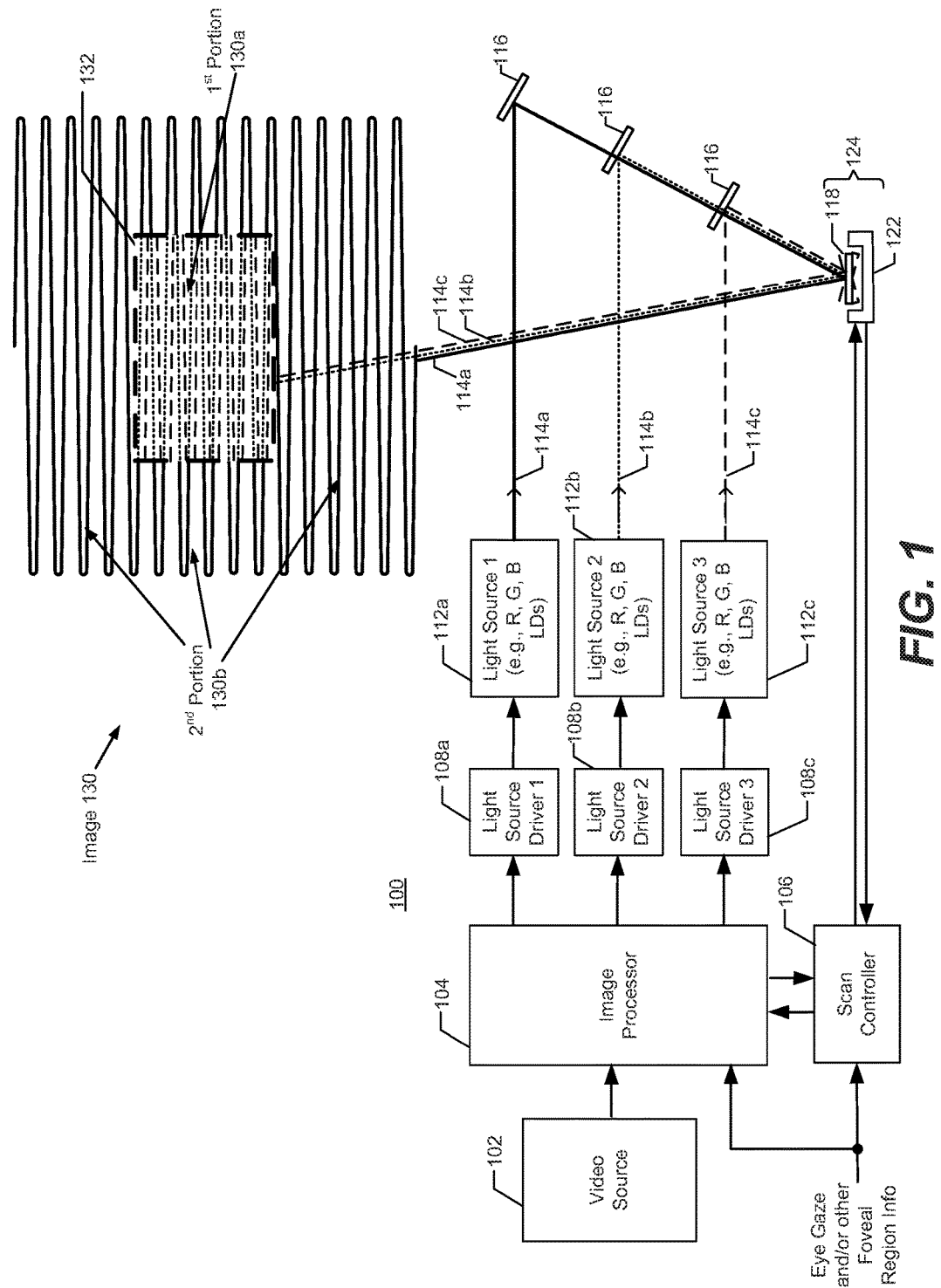
FIG. 1 illustrates a scanning display device, according to an embodiment of the present technology, which can raster scan a first portion of an image using two light beams and a second portion of an image using only one light beam to thereby provide for a greater line density, and thus, resolution, in the first portion of the image than in the second portion of the image.

FIG. 1 illustrates a scanning display device 100, according to an embodiment of the present technology. The scanning display device 100, which can also be referred to as a scanning display engine, or more generally a display engine, can be integrated with or attached to a portable device, such as, but not limited to, a mobile phone, a smart phone, a portable computer (e.g., a laptop, netbook or tablet), a personal data assistant (PDA), or a portable media player (e.g., DVD player). The scanning display device 100 can alternatively be integrated with or attached to a non-portable device, such as a desktop computer, a media player (e.g., a DVD player), or an automotive heads up display.

It is also possible that the scanning display device 100 is part of a virtual reality (VR) or augmented reality (AR) head mounted display (HMD) or heads-up display (HUD), and that the scanning display device 100 produces virtual images that are viewable by a wearer of the HMD or observer of the HUD. More specifically, light corresponding to images produced by the scanning display device 100 can be coupled into one or more optical waveguides, and after travelling through the waveguide(s) by way of total internal reflection (TIR), can be out-coupled from the waveguide(s) so that the light is output and imaged from an output-pupil associated with the waveguide(s). Such AR devices, which can be referred to as see-through, mixed reality display systems, enable a user to see through a transparent or semi-transparent display of a device to view the surrounding environment, and also see images of virtual objects (e.g., text, graphics, video, etc.) that are generated for display to appear as a part of, and/or overlaid upon, the surrounding environment. Other variations are also possible and within the scope of the embodiments of the present technology described herein.

Referring to FIG. 1, the scanning display device 100 is shown as including a video source 102, an image processor 104, a scan controller 106, light source drivers 108a, 108b and 108c, and light sources 112a, 112b and 112c. The light source drivers 108a, 108b and 108c can be referred to individually as a light source driver 108, or collectively as the light source drivers 108. The light sources 112a, 112b and 112c can be referred to individually as a light source 112, or collectively as the light sources 112. Depending on the type of video source, a video analog-font-end (AFE) (not shown) can be included between the video source 102 and the image processor 104, and the video AFE may include, e.g., one or more analog-to-digital converters (ADCs). However, a video AFE may not be needed where the video source 102 is a digital video source. The scanning display device 100 is also shown as including a MEMS scanning device 122 and MEMS mirror(s) 118, which can be collectively referred to as a MEMS scanner 124. The MEMS mirror(s) 118 can be a single biaxial MEMS mirror, or a pair of uniaxial MEMS mirrors.

The image processor 104 receives red (R), green (G) and blue (B) pixel data (or other color pixel data), a horizontal synchronization (Hsync) signal and a vertical synchronization (Vsync) signal from the video source 102 (or a video AFE). The Hsync signal includes one pulse per horizontal line of a frame, which indicates the end of one line and the beginning of the next line. The Vsync signal includes one pulse per frame, which indicates the end of one frame and the beginning of the next frame. The image processor 104 can also receive information indicative of the position and speed of the mirror(s) 118 from the scan controller 106, or alternatively, directly from the MEMS scanning device 122. The image processor 104 can also receive eye gaze information and/or other information that can be used by the image processor 104 to perform foveated rendering of images. Such eye gaze information can come from an eye tracking device or subsystem that is not specifically shown in FIG. 1.

The image processor 104 can be implemented, e.g., using an application specific integrated circuit (ASIC) and/or a micro-controller. The image processor 104 can perform scaling and/or pre-distortion of the R, G and B pixel data (also referred to simply as RGB pixel data) before such pixel data signals are provided to the light source drivers 108a and 108b. Such scaling and/or pre-distortion can include interpolation and/or decimation. More generally, the image processor 104 can perform gamma correction, color space conversion, interpolation and/or decimation. The interpolation and/or decimation can be performed to map the input RGB pixel data (received from the video source 102, or an AFE) to the output RGB pixel data that is provided to the light source drivers 108, by taking into account the actual scanning trajectory and the actual position of the scanning mirror(s) 118. The processing of the RGB pixel data (including the interpolation and/or decimation) can differ based on whether an odd frame or an even frame is being processed, and/or based on other factors. The image processor 104 can also perform foveated rendering.

The image processor 104 communicates with the scanning controller 106, which can also be referred to as scanning micro-mirror(s) controller 106, microelectromechanical systems (MEMS) controller, or a MEMS driver. The scanning controller 106 can produce a horizontal scanning control signal (H scanning control signal) and a vertical scanning control signal (V scanning control signal), which are used to control the scanning of the MEMS mirror(s) 118, which can also be referred to as micro-mirror(s) 118. Where a single biaxial scanning mirror 118 is used, the H and V scanning control signals can be combined into a combined H and V scanning control signal, which can also be referred to as a composite H and V scanning control signal, or the scanning controller 106 can produce a combined H and V scanning control signal. Where two uniaxial scanning mirrors 118 are used, the H and V scanning control signals are not combined. The combined H and V scanning control signal (or separate H and V scanning control signals) are provided to a MEMS scanning device 122 to control the scanning mirror(s) 118. While shown as two separate blocks in FIG. 1, it is also within the scope of an embodiment to combine the image processor 104 and the scanning controller 106 into one functional block or circuit.

Typically, horizontal scanning occurs much faster than vertical scanning, and thus, horizontal scanning is sometimes referred to as scanning in a fast-axis direction, and vertical scanning is sometimes referred to as scanning in a slow-axis direction. Where horizontal scanning is faster than vertical scanning, as is typically the case, the H scan control signal can also be referred to as a fast scan control signal or waveform, and the V scan control signal can also be referred to as the slow scan control signal or waveform. Where a biaxial scanning mirror is being used, the same mirror is rotated in both a fast-axis direction and a slow-axis direction. Where two uniaxial scanning mirrors are being used, one of the mirrors is rotated in the fast-axis direction, and the other one of the mirrors is rotated in the slow-axis direction.

While not shown in FIG. 1, the scanning display device 100 can also include a voltage regulator (e.g., a quad-output adjustable DC-DC buck-boost regulator) that converts a voltage provided by a voltage source (e.g., a battery or AC supply) into the various voltage levels (e.g., four voltage levels V1, V2, V3 and V4) for powering the various components of the scanning display device 100. Each of the light source drivers can include multiple (e.g., three) digital-to-analog converts (DACs), registers and a communication interface for receiving enable and clock signals from a communication interface of the image processor 104. Additionally, the image processor 104 can write data to and read data from registers within the light source drivers.

Each of the light sources 112 can include one or more light emitting elements, which in certain embodiments, includes red (R), green (G) and blue (B) laser diodes (LDs). Where each of the light sources includes R, G and B LDs, each of the light source drivers 108 include three DACs, wherein each DAC is used to drive a separate LD, or more generally, a separate light emitting element. Where the light sources 112 (that the light source drivers 108 drive) include LD type light emitting elements, each of the light source drivers 108a, 108b and 108c can be referred to as a laser diode driver (LDD). It is possible that alternative types of light emitting elements may be used in place of LDs, such as, but not limited to, one or more light emitting diode (LEDs), super luminescent light emitting diodes (SLEDs), or a quantum dot light emitting diodes (QD-LED). As will be described in additional details below, in accordance with certain embodiments of the present technology, a scanning display device can includes even more than three light source drivers 108 and more than three light sources 112. In other embodiments, such as those described with reference to FIG. 2, a scanning display device includes only two light source drivers 108 and only two light sources 112. Where a light source driver 108 is said to drive a light source 112, the light source driver 108 can more specifically be driving one or more of the light emitting elements (e.g., LDs, LEDs, SLEDs or QD-LEDs) of the light source 112.

Each of the light sources 112 can also include combiner optics. The light produced by the LDs or other light emitting elements of each light source 112 can be provided to beam splitters, which can direct a small percentage of the light toward one or more calibration photo-detectors (PDs), and direct the remainder of the light toward combiner optics, which can include dichroic lenses, dichroic mirrors, reflection plates and/or the like, which combine the R, G and B light (and/or light of one or more other wavelengths) into a single light beam. Each light source 112 can also including collimating optics. The light output by the optics can be provided to the MEMS mirror(s) 118, that is/are maneuvered (e.g., rotated) by the scanning device 122. Where the display is monochrome, each light source 112 can include a single light emitting element, or multiple light emitting elements that produce light of the same wavelength.

The separate pixel data, that is provided by the image processor 104 to each of the light source drivers 108, is used by each of the light source drivers 108 to drive a respective one of the light sources 112 to produce a light beam 114 that is modulated based on the pixel data to cause pixels of the image 130 to be displayed as the light beam 114 is raster scanned. Where a light beam 114 includes multiple colors, each color is modulated separately. For example, where a light source 112 includes R, G and B light emitting elements, the light beam 114 produced by the light source 112 will include R, G and B light that are each separately modulated based on R, G and B pixel data, respectively. If a light beam 114 is monochromic, then only one color is modulated. Accordingly, it should be appreciated that when one or more light beams 114 is/are raster scanned to produce an image, each of the light beams 114 is a modulated light beam, that is modulated based on pixel data produced by the image processor 104.

In FIG. 1, static mirrors 116 are shown as directing light beams 114a, 114b and 114c, produced by light sources 112a, 112b and 112c, respectively, toward the rotatable MEMS mirror(s) 118 such that the light beams 114a, 114b and 114c are incident on the same rotatable MEMS mirror 118. More specifically, where the MEMS mirror(s) 118 is implemented as a single biaxial MEMS mirror, each of the light beams 114a, 114b and 114c (shown, respectively, as a solid, dotted and dashed lines), when produced by the light sources 112a, 112b and 112c, is directed toward and incident on the single biaxial MEMS mirror. Where the MEMS mirror(s) 118 are implemented as a pair of uniaxial MEMS mirrors, one of which is used for horizontal scanning, and the other one of which is used for vertical scanning, each of the light beams 114a, 114b and 114c (shown, respectively, as a solid, dotted and dashed lines), when produced by the light sources 112a, 112b and 112c, is directed toward and incident on a same one of the pair of (i.e., a same one of the two) uniaxial MEMS mirrors (and then reflected towards and off of the other uniaxial MEMS mirror). The light beams 114a, 114b and 114c can be individually referred to as a light beam 114, or collectively as the light beams 114.

As noted above, the mirror(s) 118 can be implemented, for example, using a single scanning mirror (which is often referred to as a biaxial mirror) or using two uniaxial scanning mirrors. The scanning device 122 can include horizontal and vertical position sensors (e.g., Piezo-resistive sensors) that provide one or more position feedback signal(s) indicative of the position of the mirror(s) 118 to the scanning controller 106, to provide real time position information to the scanning controller 106. It is also possible that the position sensors are separate from the scanning device 122. The position sensors can sense the angle of rotation of the mirror(s) 118 along the H and V scan directions, or more generally, along the fast-axis and slow-axis scan directions. In certain embodiments, the scanning device 122 uses moving-coil actuation with a single drive coil (also referred to as an actuator coil) to maneuver a single biaxial scanning mirror 118. Alternatively, the scanning device 122 can maneuver two uniaxial scanning mirrors using two drive coils. The scanning device 122 can also be referred to as a MEMS device, the scanning mirror(s) 118 can also be referred to as MEMS scanning mirror(s), and the MEMS device 122 and the scanning mirror(s) 118 can collectively be referred to as a MEMS scanning mirror assembly 124, or simply a MEMS scanner 124.

The scan controller 106 can control the MEMS scanner 124 to maneuver the mirror(s) 118 to raster-scan the reflected light beams 114 onto a surface, e.g., a screen, a wall, the back of a chair, etc., to thereby form an image 130. Alternatively, the raster-scanned reflected light beams 114 can be coupled into input-coupler(s) of one or more optical waveguides of an HMD or HUD, and the waveguides can guide the light to output-coupler(s) that out-couple the light, as will be described below with reference to FIG. 3. Other variations are also possible.

A scanning display device, such as the device 100 described with reference to FIG. 1, functions by creating "virtual pixels," which will be referred to as hereafter more succinctly as pixels. Each pixel is a function of the position of a biaxial mirror (or the positions of two uniaxial mirrors) and the magnitude (amplitude and/or pulse width) of the signals that drive one or more light emitting elements (e.g., laser diodes) of a light source that produces a light beam that is reflected by the mirror(s) 118. The light emitting element(s) of the light source can be pulsed rapidly to create each pixel in a high resolution display. A substantial portion of display power is consumed in supporting the data bandwidth to process and drive each pixel.

Pixel density, as the term is used herein, refers to the number of pixels per unit of space, which can be either angular space or projection space. Conventionally, the pixel density of an image produced by a scanning display device is substantially the same throughout the entire image. Thus, when there has been a desire to increase a pixel density of an image, conventionally the pixel density of the entire image has been increased. This can increase both processing costs and power consumption costs, which are at least partially interrelated. For example, if a pixel count is to be increased by ~50%, e.g., from 600×600 pixels (i.e., 360,000 pixels) to 735×735 pixels (i.e., 540,225 pixels), then an image processor (e.g., 104 in FIG. 1) needs to render approximately 180,000 additional pixels per frame, which increases the amount of power consumption associated with rendering pixels. Additionally, this can also increase the amount of power consumed to display the pixels, since the number of pixels being displayed is increased by ~50%.

In order to reduce the amount of time and power necessary to render pixel data for a frame of an image, foveated rendering can be performed, which takes advantage of the fact that that the resolution of the human eye is highest in the fovea (the central vision area) and lower in peripheral areas, which can also be referred to as non-foveal areas. As a result, if a device uses an eye tracker to detect a gaze direction of a user's eye, computational load can be reduced by rendering an image that has higher resolution at the direction of gaze and lower resolution elsewhere. The portion of an image that has the higher resolution can be referred to as the foveal region, and the portion of the image that has the lower resolution can be referred to as the non-foveal region. The resolution in the entire non-foveal region can be the same. Alternatively, a non-foveal region can be subdivided into two or more regions, each having a different resolution. In accordance with certain embodiments, the location of the foveal region can be fixed, e.g., it can be assumed that a user's eye is gazing at the center (or some other portion) of an image and the foveal region can be the center (or some other portion) of the image. In accordance with alternative embodiments, the location of the foveal region can be dynamically adjusted, e.g., based on a direction of gaze of a user's eye as determined by an eye tracker. Another possibility would be to move the foveal region to a location of interest, e.g., in order to direct a user's gaze toward the location of interest. Other variations are also possible.

When foveated rending is performed to reduce a computational load associated with rendering, the same number of pixels are still typically displayed. In other words, even where pixels are rendered in a foveated manner, the display itself does not typically adjust the number of pixels displayed. Rather, a group or block of adjacent displayed pixels (e.g., a 3×3 group of pixels) located within a non-foveal portion of an image may all be identical. As a result, the same number of pixels are displayed, and thus the power consumed to display the pixels of the image is typically the same whether or not foveated rendering was performed.

Certain embodiments of the present technology, which are explained below, display less pixels within a non-foveal region than in a foveal region, which can reduce the amount of power consumption associated with rendering and displaying an image. More specifically, in accordance with certain embodiments of the present technology, a greater number of laser beams are used to raster scan the foveal region of an image than to raster scan the non-foveal region. For example, two laser beams can be used to raster scan a foveal region, while only one laser beam is used to raster scan a non-foveal region. In such an embodiment, the line density within the foveal region will be twice the line density within the non-foveal region. Where the pixels per line are the same within the foveal and non-foveal region, this would result in twice the pixel density in the foveal region than in the non-foveal region. The pixels per line can also be increased in the foveal region, which can result in an even greater increase in pixel density in the foveal region compared to the non-foveal region.

In FIG. 1, the dashed block labeled 132 illustrates an exemplary foveal region of an image 130, and the region outside of the dashed block 132 is an example of a non-foveal region of the image 130. In FIG. 1, a first portion 130a of the image 130 is shown as corresponding to the foveal region 132, and a second portion 130b of the image 130 is shown as corresponding to the non-foveal region.

Still referring to FIG. 1, the light beam 114a (shown as a solid line) produced by the light source 112a is shown as being used to scan the non-foveal region, and more generally, the second portion 130b of the image 130. When the second portion 130b of the image 130 is being scanned, the light sources 112b and 112c are turned off, or more specifically, not being driven by the light source drivers 108b and 108c. The light beams 114b and 114c (shown, respectively, as dotted and dashed lines) produced by the light sources 112b and 112c are shown as both being used to simultaneously raster scan the foveal region, and more generally, the first portion 130a of the image 130. When the first portion 130a of the image 130 is being scanned, the light source 112a is turned off, or more specifically, not being driven by the light source driver 108a. When both of the light sources 112b and 112c are turned on, their light beams 114b and 114c are both directed toward and incident on a same one of the MEMS mirror(s) 118 at substantially the same angles of incidences with a small spatial offset.

In other words, both of the light sources 108b and 108c are driven, by their respective light source drivers 108b and 108c, to produce respective light beams 114b and 114c when the first portion 130a of the image 130 is being raster scanned, wherein the first portion 130a can correspond to the foveal region 132. Conversely, when the second portion 130b of the image 130 (which can correspond to the non-foveal region) is being raster scanned, only one light source, i.e., the light source 112a, is driven by the light source driver 108a to produce the light beam 114a. In this manner, two light beams 114b and 114c are used to raster scan the foveal region, and only the one light beam 114a is used to raster scan the non-foveal region. This results in the line density within the first portion 130a that corresponds to the foveal region 132 being twice the line density within the second portion 130b that corresponds to the non-foveal region. It is noted that it also within the scope of an embodiment of the present technology to scan a foveal region using more than two light beams (e.g., three light beams), to even further increase a line density in the foveal region. Nevertheless, to simplify the below discussion, it will be assumed that only two light beams are used to scan the foveal region, and that only one light beam is used to scan the non-foveal region.

In order to raster scan the first portion 130a of the image 130 using both of the light beams 114b and 114c, the image processor 104 produces first and second pixel data that are providing to and used by the light source drivers 112b and 112c, respectively, to produces light beams 114b and 114c that are used to raster scan the first portion 130a. Where, for example, a light source includes R, G and B laser diodes, the pixel data provide to and used by the light source driver that drivers that light source can include R, G and B pixel data. In order to raster scan the second portion 130b of the image 130 using only the light beam 114a, the image processor 104 produces further pixel data that is provided to and used by the light source driver 108a to produce the light beam 112a that is used to only raster scan the second portion 130b of the image 130. The image processor 104 can perform foveated rendering that produces greater image resolution within the first portion 130a of the image 130, than within the second portion 130b of the image 130. This reduces the amount of image processing and power consumed to perform the image processing, compared to if the entire image were rendered at the image resolution of the foveal region 132.

In accordance with certain embodiments, the image processor 104 does not provide pixel data to the light source drivers 108b and 108c and/or disables the light source driver 108b and 108b during periods of time that the second portion 130b of the image 130 is being raster scanned by the MEMS scanner 124. Accordingly, when the MEMS scanner 124 is raster scanning the second portion 130b of the image 130, the light source drivers 108b and 108c do not drive the light sources 112b and 112c, and thus, the light sources 112b and 112c do not produce their light beams 114b 114c. This reduces the amount of power being consumed to drive the light sources 112 compared to if all of the light source 112a, 112b and 112c were driven during the entire raster scanning of the image 130. More generally, during periods of time that the second portion 130b of the image 130 is being raster scanned, the light beam 114a (shown as a solid line) produced by the light source 112a is directed toward and incident on one of the MEMS mirror(s) 118, and the light sources 112b and 112c are turned off. In contrast, during periods of time that the first portion 130a of the image 130 is being raster scanned, the light beams 114b and 114c (shown, respectively, as dotted and dashed lines) produced by the light sources 112b and 112c, respectively, are both directed toward and incident on one of the MEMS mirror(s) 118, and the light source 112a is turned off.

In accordance with certain embodiments, the light beams 114b and 114c that are produced by the light sources 112b and 112c and used to scan the foveal region 132 each have a respective smaller spot size than the spot size produced by the light source 112a that is used to scan the non-foveal region. This allows for a higher modulation transfer function (MTF) in the foveal region 132 than in the non-foveal region. For an example, the area of the spot size produced by the light source 112a can be approximately twice the area of the spot size produced by each of the light sources 112b and 112c. For another example, the diameter of the spot size produced by the light source 112a can be approximately twice the diameter of the spot size produced by each of the light sources 112b and 112c. Other variations are also possible.

In certain embodiments, one or more of the light sources 112 can produce light beams of different widths that result in the desired different spot sizes. This can be achieved, for example, using different sizes of light emitting elements and/or optics.

Figure 2:
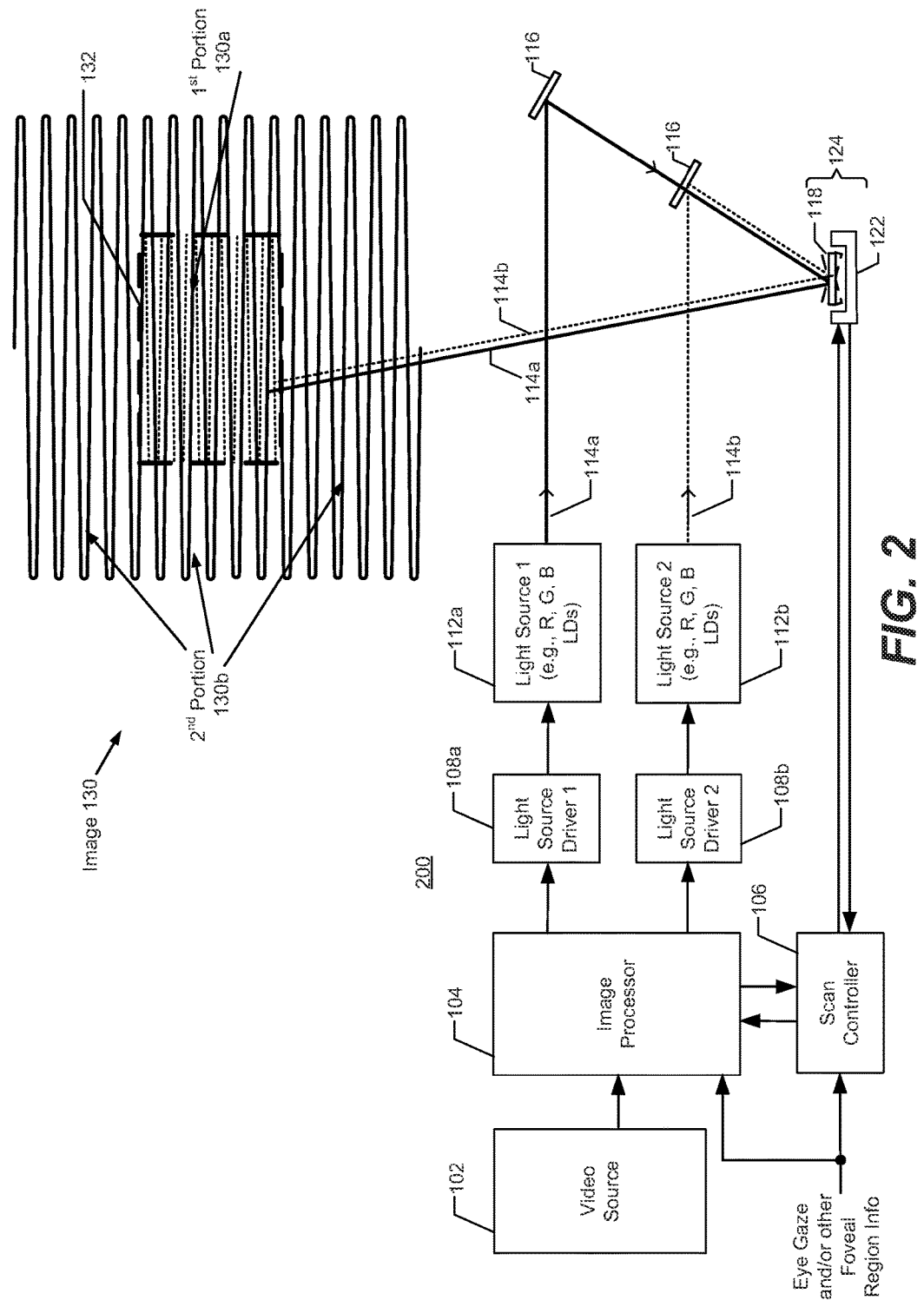
FIG. 2 illustrates a scanning display device, according to another embodiment of the present technology, which can raster scan a first portion of an image using two light beams and a second portion of an image using only one light beam to thereby provide for a greater line density, and thus, resolution, in the first portion of the image than in the second portion of the image.

FIG. 2 illustrates a scanning display device 200, according to another embodiment of the present technology, which can raster scan a first portion of an image using two light beams and a second portion of an image using only one light beam (of the two light beams used to scan the first portion) to thereby provide for a greater line density, and thus, resolution, in the first portion of the image than in the second portion of the image. Components that are the same in FIG. 2 as they are in FIG. 1 are labeled the same, and need not be explained again, except where the components are configured to operate differently. A comparison between FIGS. 1 and 2 shows that a distinction between the scanning display device 200 in FIG. 2 and the scanning display device 100 in FIG. 1 is that the scanning display device 200 in FIG. 2 does not include the light source driver 108c and the light source 112c. Rather, the scanning display device 200 is shown as including only two light source drivers, i.e., 108a and 108b, and only two light sources, i.e., 112a and 112b.

In the embodiment of FIG. 2, the scanning display device 200 uses the two light beams 114a and 114b (produced by the two light sources 112a and 112b) to scan the first portion 130a of the image, and uses only one of the two light beams 114a and 114b (produced by the two light sources 112a and 112b) to scan the second portion 130b of the image. More specifically, only the light beam 114a is used to scan the second portion 130b of the image in the embodiment of FIG. 2. Accordingly, the light beam 114a is turned on and used for raster scanning both the first portion and second portion 130a and 130b of the image 130 in the embodiment of FIG. 2. This different than in the embodiment of FIG. 1, where none of the same light beams is/are used for raster scanning both the first and second portions 130a and 130b of the image 130.

In the embodiments of described with reference to FIGS. 1 and 2, two of the light source drivers 108 drive two light sources 112 to thereby produce two light beams 114 when the first portion 130a of the image 130 is being raster scanned by the MEMS scanner 124, and only one of the light source drivers 108 drives only one of the light sources 112 to thereby produce only one light beam 114 when the second portion 130b of the image 130 is being raster scanned by the MEMS scanner 124. A benefit of the embodiment of FIG. 2 over the embodiment of FIG. 1 is that the embodiment of FIG. 1 requires one less light source driver 108 and one less light source 112, likely reducing the part count, size, weight and cost. However, a benefit of the embodiment of FIG. 1 over the embodiment of FIG. 2 is that in the embodiment of FIG. 1 the spot size of each of the two light beams 114 that are used to raster scan the first portion 130a of the image 130 can be made smaller than the spot size of the one light beam 114 that is used to raster scan the second portion 130b of the image, which can provide for a higher MTF in the first portion 130a of the image 130, which as noted above, can correspond to a foveal region.

As was just explained above, the scanning display device 200 of FIG. 2 raster scans the first portion 130a of the image 130 using both of the light beams 114a and 114b, and raster scans the second portion 130b of the image using only the light beam 114a. In accordance with an embodiment, in order to achieve this, the image processor 104 produces first pixel data that is provided to and used by the light source driver 108a to produce the light beam 114a for use in scanning the entire image 130, including both the first and second portions 130a and 130b. The image processor 104 also produces second pixel data that is provided to and used by the light source driver 108b to produce the light beam 114b for use in scanning the second portion 130b of the image 130, but not the first portion 130a of the image. As was the case with the embodiment of FIG. 1, the image processor 104 can perform foveated rendering that produces greater image resolution within the first portion 130a of the image 130, than within the second portion 130b of the image 130. This reduces the amount of image processing and power consumed to perform the image processing, compared to if the entire image were rendered at the image resolution of the foveal region 132.

In accordance with certain embodiments, the image processor 104 does not provide pixel data to the light source driver 108b and/or disables the light source driver 108b during periods of time that the second portion 130b of the image 130 is being raster scanned by the MEMS scanner 124. Accordingly, when the MEMS scanner 124 is raster scanning the second portion 130b of the image 130, the light source drivers 108b does not drive the light sources 112b, and thus, the light source 112b does not produce the light beam 114b. This reduces the amount of power being consumed to drive the light sources 112 compared to if both of the light source 112a and 112b were driven during the entire raster scanning of the image 130. More generally, during periods of time that the second portion 130b of the image 130 is being raster scanned, the light beam 114a (shown as a solid line) produced by the light source 112a is directed toward and incident on one of the MEMS mirror(s) 118, and the light source 112b is turned off. In contrast, during periods of time that the first portion 130a of the image 130 is being raster scanned, the light beams 114a and 114b (shown, respectively, as solid and dotted lines) produced by the light sources 112a and 112b, respectively, are both directed toward and incident on one of the MEMS mirror(s) 118.

As noted above, the first portion 130a of the image 130 that has the greater line and pixel density can correspond to the foveal region, and the second portion 130b of the image 130 that has the lower line and pixel density can correspond to the non-foveal region. In accordance with certain embodiments, the location of the foveal region can be fixed, e.g., it can be assumed that a user's eye is gazing at the center (or some other portion) of an image and the foveal region can be the center (or some other portion) of the image. For example, referring to FIGS. 1 and 2, the first portion 130a of the image 130 is shown as being centered about a location in the center of the image 130. Rather than the location of the foveal region being fixed, in accordance with alternative embodiments, the location of the foveal region can be dynamically adjusted, e.g., based on a direction of gaze of a user's eye as determined by an eye tracker. For example, in response to determining that the gaze transitions from the center of the image to a location within the lower left portion of the image, the location of the foveal region can be accordingly changed so that the location in the image at which the eye is gazing is generally at the center of the foveal region. Another possibility would be to move the foveal region to a location of interest, e.g., in order to direct a user's gaze toward the location of interest. Other variations are also possible.

A human eye essentially integrates light that is incident on the eye when perceiving brightness. This is why a human eye cannot typically perceive the difference between pixels that have their brightness controlled by amplitude modulation, pixels that have their brightness controlled by pulse width modulation, and pixels that have their brightness controlled by a combination of amplitude and pulse width modulation. Because of the way that a human eye perceives brightness, if not correctly compensated for, a portion of an image that has a greater density could be perceived to be significantly brighter than a portion of an image having a lower density, which could adversely affect the overall image quality. For a simple example, assume an entire frame of an image is to have a same color (e.g., green) and same brightness. If the magnitude information included in the pixel data used to generate pixels in a portion of the image having a greater density is the same as the magnitude information included in further pixel data used to generate pixels in a further portion of the image having a lower density, then the portion of the image having the higher density will appear brighter to an eye that is viewing the image. In accordance with certain embodiments of the present technology, the pixel data is produced (e.g., by the image processor 104 in FIG. 1) in such a manner so as to compensate for this situation. Where the first portion of the image has double the line density as the second portion of the image, the image processor 104 can select the magnitudes at which the light emitting elements of the light sources 112 are driven to compensate for how brightnesses of first and second portions of the image are affected by the first portion of the image being raster scanned using two light beams 114 while the second portion of the image is raster scanned using only one light beam 114. Further, where spot sizes of the light beams 114 are not all the same, the image processor 104 should also take this into account when selecting appropriate magnitudes at which light sources, and more specifically the light emitting elements thereof, are driven.

Regardless of the embodiment, the image processor 104 preferably produces pixel data for the various light source drivers 108 to ensure that transitions between foveal and non-foveal regions are blended smoothly and substantially seamlessly, so that a viewer is not distracted by the transitions. Further, the image processor 104 should ensure that the perceived brightness and gamut is matched between the foveal and non-foveal regions.

As noted above, the scanning display device 100 or 200, which can also be referred to as a scanning display engine, or more generally a display engine, can be integrated with or attached to a portable device, such as, but not limited to, a mobile phone, a smart phone, a portable computer (e.g., a laptop, netbook or tablet), a PDA, or a portable media player (e.g., DVD player). As also noted above, the scanning display device 100 or 200 can alternatively be integrated with or attached to a non-portable device, such as a desktop computer, a media player or an automotive heads up display. It is also possible that the scanning display device 100 or 200 is part of a VR or AR HMD or HUD, and that the scanning display device 100 produces virtual images that are viewable by a wearer of the HMD or observer of the HUD. The images produced by the scanning display device 100 or 200 can be projected onto a screen or other surface. Alternatively, light corresponding to images produced by the scanning display device 100 or 200 can be coupled into one or more optical waveguides, and after travelling through the waveguide(s) by way of total internal reflection (TIR), can be out-coupled from the waveguide(s) so that the light is output and imaged from an output-pupil associated with the waveguide(s), e.g., as shown in and described with reference to FIG. 3.

Figure 3:
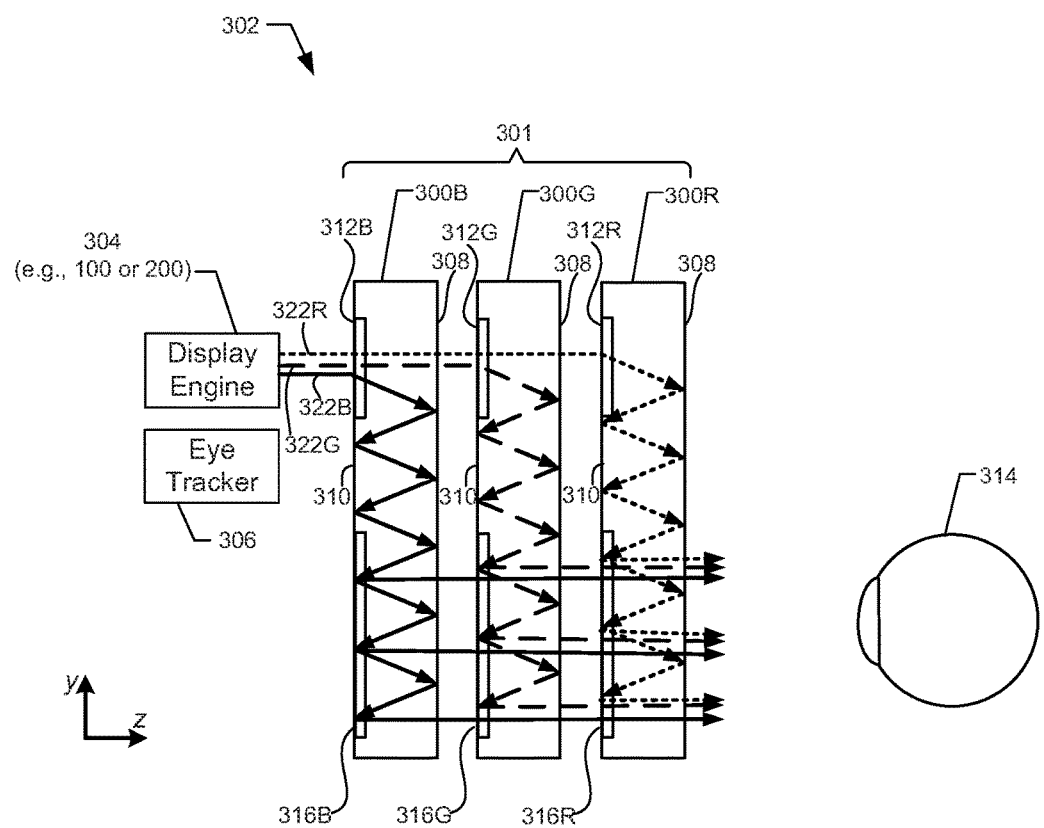
FIG. 3 is a side view of an exemplary display system, according to an embodiment of the present technology.

FIG. 3 is a side view of an exemplary display system 302, according to an embodiment of the present technology. The display system 302 is shown as including three optical waveguides labeled 300R, 300G, 300B and a display engine 304 that generates an image including angular content that is coupled into the waveguides 300R, 300G and 300B by respective input-couplers 312R, 312G and 312B. The display engine 304 can be implemented to be or include the scanning display device 100 or 200. FIG. 3 also shows a human eye 314 that is viewing the image (as a virtual image) within an eye box that is proximate output-couplers 316R, 316G and 316B. Explained another way, the human eye 314 is viewing the image from an output-pupil associated with the waveguides 300R, 300G and 300B. The display system 302 can be, e.g., a near eye display (NED) or a heads up display (HUD) system, but is not limited thereto.

The optical waveguides 300R, 300G and 300B can be configured, respectively, to transfer red, green and blue light corresponding to an image from an input-pupil to an output-pupil. More specifically, an input-coupler 312R of the waveguide 300R can be configured to couple light (corresponding to a scanned image) within a red wavelength range into the waveguide 300R, and the output-coupler 316R of the waveguide 300R can be configured to couple light (corresponding to the image) within the red wavelength range (which has travelled from the input-coupler 312R to the output-coupler 316R by way of TIR) out of the waveguide 300R. Similarly, an input-coupler 312G of the waveguide 300G can be configured to couple light (corresponding to the scanned image) within a green wavelength range into the waveguide 300G, and the output-coupler 316G of the waveguide 300G can be configured to couple light (corresponding to the image) within the green wavelength range (which has travelled from the input-coupler 312G to the output-coupler 316G by way of TIR) out of the waveguide 300G. Further, an input-coupler 312B of the waveguide 300B can be configured to couple light (corresponding to the scanned image) within a blue wavelength range into the waveguide 300B, and the output-coupler 316B of the waveguide 300B can be configured to couple light (corresponding to the image) within the blue wavelength range (which has travelled from the input-coupler 312B to the output-coupler 316B by way of TIR) out of the waveguide 300B. In accordance with an embodiment, the red wavelength range is from 600 nm to 650 nm, the green wavelength range is from 500 nm to 550 nm, and the blue wavelength range is from 430 nm to 480 nn. Other wavelength ranges are also possible.

The optical waveguides 300R, 300G and 300B can be referred to collectively as the waveguides 300, or individually as a waveguide 300. Two or more of the waveguides 300 can be referred to as a waveguide assembly 301. More specifically, multiple waveguides 300 can be stacked, back-to-back, to provide the waveguide assembly 301. The distance between adjacent waveguides 300 of the waveguide assembly 301 can be, e.g., between approximately 50 micrometers (μm) and 300 μm, but is not limited thereto. While not specifically shown, spacers can be located between adjacent waveguides 300 to maintain a desired spacing therebetween. The input-couplers 312G, 312R and 312B can be referred to collectively as the input-couplers 312, or individually as an input-coupler 312. Similarly, the output-couplers 316G, 316R and 316B can be referred to collectively as the output-couplers 316, or individually as an output-coupler 316. While the waveguide assembly 301 is shown as including three waveguides 300, it is also possible that a waveguide assembly include more or less than three waveguides.

In FIG. 3, the dotted arrowed line 322R is representative of red (R) light corresponding to an image that is output by the display engine 304, the dashed arrowed line 322G is representative of green (G) light corresponding to the image that is output by the display engine 304, and the solid arrowed line 322B is representative of blue (B) light corresponding to the image that is output by the display engine 304. While the R, G and B light (322R, 322G and 322B) is shown as being spatially offset from one another, this is likely not the case, but rather, FIG. 3 was drawn in this manner so that the R, G and B light can be separately represented. More likely, the R, G and B light (322R, 322G and 322B) that exits the display engine 304 would completely overlap one another. Further, while the waveguides 300R, 300G and 300B are shown as being stacked in a specific order, the order in which the waveguides 300 are stacked can be changed.

In accordance with specific embodiments, the display engine 304 is implemented using the scanning display device 100 described above with reference to FIG. 1, or the scanning display device 200 described above with reference to FIG. 2, or a similar scanning display device. In FIG. 3, the display engine 304 is shown as facing back-side surfaces 310 of the waveguides 300, and the eye 314 is shown as facing front-side surfaces 308 opposite and parallel to the back-side surfaces 310. This provides for a periscope type of configuration in which light enters the waveguide on first sides of the waveguides 300, and exits the waveguides 300 at an opposite sides of the waveguides 300. Alternatively, the input-couplers 312 and the output-couplers 316 can be implemented in a manner such that the display engine 304 and the eye 314 are proximate to and face a same major planar surface (308 or 310).

The waveguide assembly 301 can be incorporated into a see-through mixed reality display device system, but is not limited to use therewith. A separate instance of the waveguide assembly 301 and the display engine 304 can be provided for each of the left and right eyes of a user. In certain embodiments, such waveguide assemblies 301 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 304 can be located to the side of the frame so that it sits near to a user's temple. Alternatively, the display engine 304 can be located in a central portion of the HMD glasses that rests above a nose bridge of a user. Other locations for the display engine 304 are also possible. In these instances, the user can also be referred to as a wearer. Where there is a separate waveguide assembly for each of the left and right eyes of a user, there can be a separate display engine 304 for each of the waveguide assemblies, and thus, for each of the left and right eyes of the user. One or more further adjacent waveguides can be used to perform eye tracking based on infrared light that is incident on and reflected from the user's eye 314, as is known in the art.

Block 306 in FIG. 3 is representative of an eye tracker that can be used to track the gaze of an eye. The eye tracker 306 can utilize one or more further adjacent waveguides to perform eye tracking based on infrared light that is incident on and reflected from the user's eye 314, as noted above, as is known in the art. It is also possible that the eye tracker 306 not utilize any waveguides, as is also known in the art. Rather, they eye tracker 306 can direct light directly into the eye 314 and detect direct reflections therefrom. The eye tracker 306 can include, e.g., a light source that emits infrared light (or light of another wavelength), and a light sensor or camera that produces eye tracking data, as is known in the art. The eye tracker 306 can detect infrared light (or, light of another wavelength) reflected from the eye 314 and sensed by a video camera or some other specially designed optical sensor. The information is then analyzed to extract eye rotation from changes in reflections. Video-based eye trackers typically use the corneal reflection (also known as the first Purkinje image) and the center of the pupil as features to track over time. For another example, a dual-Purkinje type of eye tracker can use reflections from a front of the cornea (also known as the first Purkinje image) and the back of the lens (also known as the fourth Purkinje image) as features to track. The eye tracker 306 can alternatively image features from inside the eye, such as the retinal blood vessels, and follow these features as the eye rotates. The use and inclusion of other types of eye trackers is also within the scope of the embodiments described herein.

Figure 4:
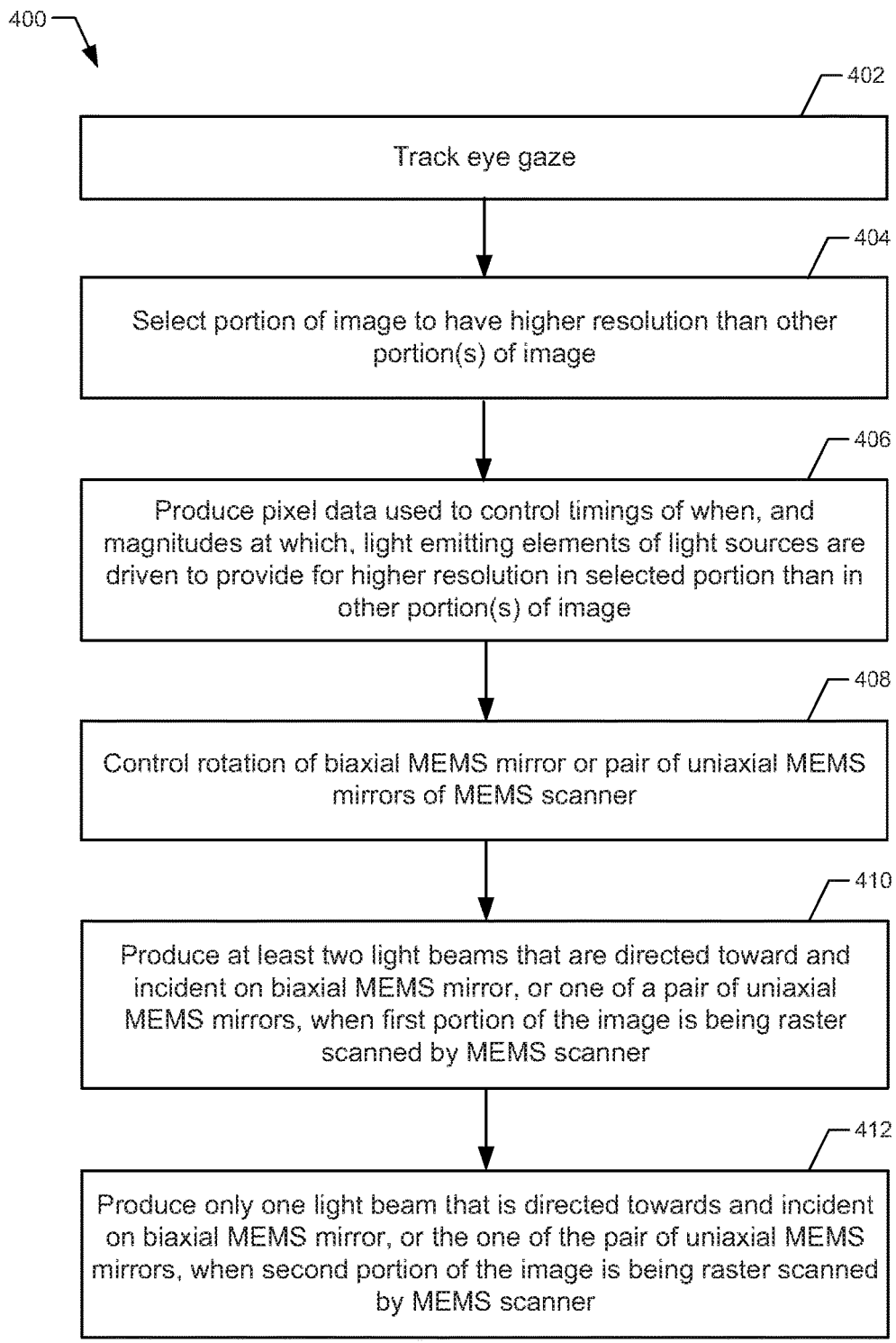
FIG. 4 is a high level flow diagram used to summarize methods according to various embodiments of the present technology which can be used to raster scan an image.

The high level flow diagram of FIG. 4 will now be used to summarize methods according to various embodiments of the present technology which can be used to raster scan an image. Such methods are for use with a MEMS scanner that includes a biaxial MEMS mirror or a pair of uniaxial MEMS mirrors. The steps described with reference to FIG. 4 are not necessarily performed in the order shown. For example, many of the steps may be performed at the same time. However, where a step depends on the results of another step, an order may be implied.

Referring to FIG. 4, step 402 involves tracking eye gaze of a user of a near eye display or a heads up display, but not limited thereto. Referring back to FIG. 3, the eye tracker 305, or some alternative type of eye tracker, can be used to perform step 402. Any known or future developed technique for tracking eye gaze can be used, as no specific technique for tracking eye gaze is required to implement the embodiments summarized with reference to FIG. 4.

Step 404 involves selecting a portion of an image that is to have a higher resolution that one or more other portions of the image. In accordance with certain embodiments, the portion of the image that is selected to have a higher resolution is based on the eye gaze location that is detected at step 402. For example, a portion of the image that is centered about the eye gaze location can be selected to have the higher resolution. In other embodiments, the portion of the image having the higher resolution can be a predetermined fixed location, e.g., within the center of the image. In still other embodiments, the portion of the image having the higher resolution can be a portion of interest, e.g., in order to direct a user's gaze toward the portion of interest. The portion of interest can move, or can be static. Other variations are also possible. Where eye gaze is not used to select the portion of the image that is to have the higher resolution at step 604, step 602 can be eliminated from the methods summarized with reference to FIG. 4 (although detected eye gaze can be used for other purposes, unrelated to the embodiments specifically described herein). Further, where the portion of the image that is to have the higher resolution is fixed, step 404 can be eliminated.

Still referring to FIG. 4, step 406 involves producing pixel data used to control timings of when, and magnitudes at which, light emitting elements of light sources (e.g., 112) are driven to provide for higher resolution of a specific (e.g., selected) portion of an image than in other portion(s) of the image. The magnitudes can be specified as amplitudes, pulse widths, or a combination thereof. Where a light source includes red, green and blue light emitting elements, the pixel data can include red, green and blue pixel data that is produced for and provided to each of a plurality of light source drivers (e.g., 108). Step 406 can be performed, e.g., by the image processor 104 shown in and described above with reference to FIGS. 1 and 2. Step 406 can involve, inter alia, foveal rendering of an image, and more specifically, frames thereof.

Step 408 involves controlling rotation of a biaxial MEMS mirror or a pair of uniaxial MEMS mirrors of the MEMS scanner. Step 408 can be performed, e.g., by the scan controller 106 shown in FIGS. 1 and 2. The MEMS mirror(s) controlled at step 402 can be the MEMS mirror(s) 118 shown in FIGS. 1 and 2. Step 408 can include controlling rotation of the MEMS mirror(s) in a fast-axis direction and a slow-axis direction in order to raster scan an image using light beams reflected from the MEMS mirror(s).

Step 410 involves producing at least two light beams that are directed toward and incident on the biaxial MEMS mirror, or one of the pair of uniaxial MEMS mirrors, when a first portion of the image is being raster scanned by the MEMS scanner. Step 412 involves producing only one light beam that is directed towards and incident on the biaxial MEMS mirror, or one of the pair of uniaxial MEMS mirrors, when a second portion of the image is being raster scanned by the MEMS scanner. Examples of the first portion and second portions of an image 130 are labeled 130a and 130b, respectively, in FIGS. 1 and 2.

In accordance with certain embodiments, the first portion (e.g., 130a) of the image has a first line density and corresponds to a foveal region of the image, and the second portion (e.g., 130b) of the image has a second line density that is lower than the first line density and corresponds to a non-foveal region of the image.

In accordance with certain embodiments, such as the embodiment described above with reference to FIG. 1, the only one light beam (e.g., 114a), that is produced when the second portion (e.g., 130b) of the image is being raster scanned by the MEMS scanner, is neither of the two light beams (e.g., 114b and 114c) that are produced when the first portion of the image is being raster scanned by the MEMS scanner. In accordance with other embodiments, such as the embodiment described above with reference to FIG. 2, the only one light beam (e.g., 114a), that is produced when the second portion (e.g., 130b) of the image is being raster scanned by the MEMS scanner, is one of the two light beams (e.g., 114a and 114b) that are produced when the first portion of the image is being raster scanned by the MEMS scanner.

In accordance with certain embodiments, there are separate pathways for foveated and non-foveated content, which collectively cover the full possible field of view, because a user can look at different portions of the field of view at any one time. Each pathway can have its own light source, but can leverage the same optics pathway to the user. In certain embodiments, two pathways share a light source, but one of the pathways also includes one or more additional light sources. In certain embodiments, somewhere along the pathway, the two content types are combined optically, e.g., at the MEMS mirror(s). But this design may also be useful for other display types as well.

While not limited to use with AR and VR systems, embodiments of the present technology are especially useful therewith since AR and VR systems provide for their best immersion when there is high resolution is in a foveal region. Embodiments of the present technology described herein provide a scanning display which can support high resolution in a foveal region and lower resolution outside that region.

Note that the discussion above introduces many different features and many embodiments. It is to be understood that the above-described embodiments are not all mutually exclusive. That is, the features described above (even when described separately) can be combined in one or multiple embodiments.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, the term "based on" may be read as "based at least in part on."

For purposes of this document, without additional context, use of numerical terms such as a "first" object or portion, a "second" object or portion, and a "third" object or portion may not imply an ordering of objects or portion, but may instead be used for identification purposes to identify different objects or portions. For example, the terms first and second, when referring to the first and second portions of an image, are not intended to imply that the first portion is produced or scanned prior to the second portion. Rather, these terms are used to distinguish one portion of an image from another portion.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    a MEMS scanner including a biaxial MEMS mirror or a pair of uniaxial MEMS mirrors;
    a controller communicatively coupled to the MEMS scanner and configured to control rotation of the biaxial MEMS mirror or the pair of uniaxial MEMS mirrors of the MEMS scanner;
    a plurality of light sources each of which comprises one or more light emitting elements;
    a plurality of light source drivers, each of which is configured to selectively drive a respective one of the light sources to thereby produce a respective light beam that is directed towards and incident on the biaxial MEMS mirror or one of the pair of uniaxial MEMS mirrors; and an image processor communicatively coupled to each of the light source drivers and configured to
cause at least two of the light source drivers to drive at least two of the light sources to thereby produce at least two light beams to raster scan, by the MEMS scanner, a first portion of an image; and
cause only one of the light source drivers to drive only one of the light sources to thereby produce only one light beam to raster scan, by the MEMS scanner, a second portion of the image.

2. The apparatus of claim 1, wherein:
the plurality of light sources comprise first, second and third light sources;
the plurality of light source drivers comprise first, second and third light source drivers; and
the image processor is configured to
cause the first light source driver to not drive the first light source, and cause the second and third light source drivers to drive the second and third light sources respectively to thereby produce two light beams, when the first portion of the image is being raster scanned by the MEMS scanner; and
cause the second and third light source drivers to not drive the second and third light sources, and cause the first light source driver to drive the first light source to thereby produce only one light beam, when the second portion of the image is being raster scanned by the MEMS scanner.

3. The apparatus of claim 2, wherein a respective spot size of each of the two light beams, used to raster scan the first portion of the image, is smaller than a spot size of the only one light beam used to raster scan the second portion of the image.

4. The apparatus of claim 1, wherein:
the plurality of light sources comprise first and second light sources;
the plurality of light source drivers comprise first and second light source drivers; and
the image processor is configured to
cause the first and second light source drivers to drive the first and second light sources, respectively, to thereby produce two light beams, when the first portion of the image is being raster scanned by the MEMS scanner; and
cause the second light source driver to not drive the second light source, and cause the first light source driver to drive the first light source to thereby produce only one light beam, when the second portion of the image is being raster scanned by the MEMS scanner.

5. The apparatus of claim 1, wherein:
each of the plurality of light sources comprises red, green and blue laser diodes that are configured to respectively emit red, green and blue light and one or more optical elements that is/are configured to combine the red, green and blue light into a said light beam; and
wherein each of the light source drivers is configured to selectively drive the red, green and blue laser diodes of a respective one of the light sources to thereby selectively drive the respective one of the light sources.

6. The apparatus of claim 1, wherein:
the first portion of the image has a first line density; and
the second portion of the image has a second line density that is lower than the first line density.

7. The apparatus of claim 6, wherein:
the first portion of the image comprises a foveal region of the image; and
the second portion of the image comprises a non-foveal region of the image.

8. The apparatus of claim 1, wherein a location of the first portion of the image is fixed relative to a rest of the image.

9. The apparatus of claim 1, wherein a location of the first portion of the image is dynamic relative to a rest of the image.

10. The apparatus of claim 9, wherein the location of the first portion of the image is based on a gaze of an eye, and changes in response to the gaze changing.

11. A method for use with a MEMS scanner that includes a biaxial MEMS mirror or a pair of uniaxial MEMS mirrors that are used to raster scan an image, the method comprising:
controlling rotation of the biaxial MEMS mirror or the pair of uniaxial MEMS mirrors of the MEMS scanner;
producing at least two light beams that are directed toward and incident on the biaxial MEMS mirror, or one of the pair of uniaxial MEMS mirrors, to raster scan, by the MEMS scanner, a first portion of the image; and
producing only one light beam that is directed towards and incident on the biaxial MEMS mirror, or one of the pair of uniaxial MEMS mirrors, to raster scan, by the MEMS scanner, a second portion of the image.

12. The method of claim 11, wherein:
the first portion of the image has a first line density and comprises a foveal region of the image; and
the second portion of the image has a second line density that is lower than the first line density and comprises a non-foveal region of the image.

13. The method of claim 12, wherein the only one light beam, that is produced when the second portion of the image is being raster scanned by the MEMS scanner, comprises none of the two light beams that are produced when the first portion of the image is being raster scanned by the MEMS scanner.

14. The method of claim 12, wherein the only one light beam, that is produced when the second portion of the image is being raster scanned by the MEMS scanner, comprises one of the two light beams that are produced when the first portion of the image is being raster scanned by the MEMS scanner.

15. The method of claim 11, wherein a location of the first portion of the image is dynamic relative to a rest of the image, and further comprising:
tracking a gaze of an eye; and
determining a location of the first portion of the image based on the tracked gaze;
wherein the location of the first portion of the image changes in response to the tracked gaze changing.

16. A near eye or heads up display system, comprising:
a MEMS scanner including a biaxial MEMS mirror or a pair of uniaxial MEMS mirrors;
a controller communicatively coupled to the MEMS scanner and configured to control rotation of the biaxial MEMS mirror or the pair of uniaxial MEMS mirrors of the MEMS scanner;
a plurality of light sources each of which comprises one or more light emitting elements;
a plurality of light source drivers, each of which is configured to selectively drive a respective one of the light sources to thereby produce a respective light beam that is directed towards and incident on the biaxial MEMS mirror or one of the pair of uniaxial MEMS mirrors;

an image processor communicatively coupled to each of the light source drivers and configured to
  cause at least two of the light source drivers to drive at least two of the light sources to thereby produce at least two light beams when a first portion of an image is being raster scanned by the MEMS scanner; and
  cause only one of the light source drivers to drive only one of the light sources to thereby produce only one light beam when a second portion of the image is being raster scanned by the MEMS scanner; and one or more optical waveguides each of which includes an input-coupler and an output-coupler;

wherein light corresponding to the first and second portions of the image that are raster scanned using the biaxial MEMS mirror or the pair of uniaxial MEMS mirrors, under the control of the controller, is coupled into the one or more optical waveguides via the input-coupler(s) of the one or more optical waveguide(s);

wherein the light corresponding to the first and second portions of the image, that is coupled into the one or more optical waveguides via the input-coupler(s), travels at least in part by way of total internal reflection (TIR) from the input-coupler(s) to the output-coupler(s) of the one or more optical waveguides; and wherein the output-coupler(s) is/are configured to couple the light corresponding to the first and second portions of the image, that has traveled within the one or more optical waveguides from the input-coupler(s) to the output-coupler(s), out of the one or more optical waveguides.

17. The system of claim 16, wherein:
the first portion of the image comprises a foveal region of the image; and
the second portion of the image comprises a non-foveal region of the image.

18. The system of claim 17, further comprising:
an eye tracker configured to track a gaze of an eye;
wherein the image processor is configured to change a location of the first portion of the image based on changes to the gaze, as determined using the eye tracker.

19. The system of claim 16, wherein a respective spot size of each of the at least two light beams, used to raster scan the first portion of the image, is smaller than a spot size of the only one light beam used to raster scan the second portion of the image.

20. The system of claim 16, wherein:
the plurality of light sources comprise first, second and third light sources;
the plurality of light source drivers comprise first, second and third light source drivers; and
the image processor is configured to
  cause the first light source driver to not drive the first light source, and cause the second and third light source drivers to drive the second and third light sources respectively to thereby produce two light beams, when the first portion of the image is being raster scanned by the MEMS scanner; and
  cause the second and third light source drivers to not drive the second and third light sources, and cause the first light source driver to drive the first light source to thereby produce only one light beam, when the second portion of the image is being raster scanned by the MEMS scanner.

* * * * *